United States Patent
Yu et al.

(10) Patent No.: US 11,096,237 B2
(45) Date of Patent: *Aug. 17, 2021

(54) METHOD AND APPARATUS FOR IMPLEMENTING RADIO RESOURCE CONTROL OF MULTI-CONNECTIVITY

(71) Applicant: NOKIA SOLUTIONS AND NETWORKS OY, Espoo (FI)

(72) Inventors: Ling Yu, Kauniainen (FI); Vinh Van Phan, Oulu (FI); Amaanat Ali, Espoo (FI); Christian Mahr, Ulm (DE); Andrea Cattoni, Nibe (DK); Yang Liu, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,003

(22) Filed: Mar. 3, 2020

(65) Prior Publication Data
US 2020/0205217 A1 Jun. 25, 2020

Related U.S. Application Data

(63) Continuation of application No. 15/758,216, filed as application No. PCT/EP2016/071067 on Sep. 7, 2016, now Pat. No. 10,609,757.

(30) Foreign Application Priority Data

Sep. 7, 2015 (IN) .......................... 2803/DEL/2015

(51) Int. Cl.
*H04W 56/00* (2009.01)
*H04W 76/27* (2018.01)
(Continued)

(52) U.S. Cl.
CPC ......... *H04W 76/27* (2018.02); *H04W 28/085* (2013.01); *H04W 76/15* (2018.02);
(Continued)

(58) Field of Classification Search
CPC ... H04W 76/27; H04W 76/15; H04W 28/085; H04W 36/0069; H04W 28/08; H04W 84/20
(Continued)

(56) References Cited

U.S. PATENT DOCUMENTS

2013/0336296 A1* 12/2013 Dinan .................. H04W 76/27
370/336
2014/0219248 A1* 8/2014 Reddiboyana ........ H04W 76/15
370/331
(Continued)

FOREIGN PATENT DOCUMENTS

CN 103747442 A 4/2014
CN 103959829 A 7/2014
(Continued)

OTHER PUBLICATIONS

International Search Report & Written Opinion dated Dec. 8, 2016, corresponding to International Patent Application No. PCT/EP2016/071067. Copy submitted in parent U.S. Appl. No. 157/58,216.
(Continued)

*Primary Examiner* — Sai Ming Chan
(74) *Attorney, Agent, or Firm* — Squire Patton Boggs (US) LLP

(57) ABSTRACT

A method and apparatus may include receiving, by a user equipment from a first access point which supports a first radio access technology, a radio-resource-control (RRC) reconfiguration message including an RRC configuration information of a second access point, after an initiation of a slave RRC at the second access point has been determined.
(Continued)

The second access point supports a second radio access technology, and performing, by the user equipment, a random access procedure with the second access point based on the RRC reconfiguration message. The user equipment is configured to have an RRC connection with the first access point and the first access point is a master node.

12 Claims, 11 Drawing Sheets

(51) Int. Cl.
*H04W 76/15* (2018.01)
*H04W 28/08* (2009.01)
*H04W 84/20* (2009.01)
*H04L 5/00* (2006.01)
*H04W 36/00* (2009.01)

(52) U.S. Cl.
CPC ............. *H04L 5/001* (2013.01); *H04W 28/08* (2013.01); *H04W 36/0069* (2018.08); *H04W 84/20* (2013.01)

(58) Field of Classification Search
USPC ......................................................... 370/235
See application file for complete search history.

(56) References Cited

U.S. PATENT DOCUMENTS

| 2014/0335869 | A1 | 11/2014 | Choi et al. | |
|---|---|---|---|---|
| 2015/0029955 | A1* | 1/2015 | Heo .................. | H04W 72/0446 370/329 |
| 2015/0146687 | A1 | 5/2015 | Kim et al. | |
| 2016/0057585 | A1* | 2/2016 | Horn ..................... | H04L 45/245 370/312 |
| 2016/0219475 | A1* | 7/2016 | Kim ...................... | H04W 76/27 |
| 2017/0111932 | A1* | 4/2017 | Uemura ................ | H04L 5/0048 |
| 2017/0150384 | A1* | 5/2017 | Rune .................... | H04W 72/085 |
| 2017/0286410 | A1* | 10/2017 | Xu ....................... | H04W 72/042 |

FOREIGN PATENT DOCUMENTS

| CN | 104349419 A | 2/2015 |
|---|---|---|
| JP | 2012-525720 A | 10/2012 |
| WO | 2010/125982 A1 | 11/2010 |
| WO | 2015/002466 A2 | 1/2015 |

OTHER PUBLICATIONS

Sharp, "Initial radio resource configuration for Dual connectivity," 3GPP Draft; R2-133477, 3GPP TSG-RAN WG2#83bis, Ljubljana, Slovenia, Sep. 27, 2013, XP050719060. Copy submitted in parent U.S. Appl. No. 157/58,216.
Ericsson, "Signalling procedures for dual connectivity," 3GPP Draft; R2-134219, 3GPP TSG-RAN WG2 #84, San Francisco, CA, USA, Nov. 13, 2013, XP050736966. Copy submitted in parent U.S. Appl. No. 157/58,216.
3GPP TR 36.842 V12.0.0 (Dec. 2013), Technical Report, 3rd Generation Partnership Project; Technical Specification Group Radio Access Network; Study on Small Cell enhancements for E-UTRA and E-UTRAN; Higher layer aspects (Release 12), Dec. 2013. Copy submitted in parent U.S. Appl. No. 157/58,216.
Indian Office Action corresponding to IN Appln. No. 2803/DEL/2015, dated Feb. 14, 2020.
Chinese Office Action corresponding to CN Application No. 201680062310.3, dated Dec. 31, 2020.
3GPP TR 36.875 V1.1.0 (Apr. 2015), 3rd Generation Partnership Project; Technical Specification Group Radio Access Network; Evolved Universal Terrestrial Radio Access Network; (E-UTRAN); Extension of Dual Connectivity in EUTRAN (Release 13), 21 pages.
European Communication pursuant to Article 94(3) EPC, corresponding to EP Application No. 16 763 246.2, dated May 25, 2021.

* cited by examiner

METHOD AND APPARATUS FOR IMPLEMENTING RADIO RESOURCE CONTROL OF MULTI-CONNECTIVITY

CROSS REFERENCE TO RELATED APPLICATIONS

This application is a 37 C.F.R. § 1.53(b) continuation of co-pending U.S. patent application Ser. No. 15/758,216, filed on Mar. 7, 2018, which is the National Stage of PCT International Application No. PCT/EP2016/071067, filed on Sep. 7, 2016, which claims priority to Indian Application No. 2803/DEL/2015, filed on Sep. 7, 2015. The entire content of the above-referenced applications is hereby incorporated by reference.

BACKGROUND

Field

Embodiments of the present invention relate to implementing radio resource control of multi-connectivity.

Description of the Related Art

LTE is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may include determining, by a network node, that a slave radio-resource-control function is to be initiated. The slave radio-resource-control function is performed by an access point. The method may also include transmitting a message to the access point. The message comprises at least one of a request to initiate the slave radio-resource-control function and a confirmation that the slave radio-resource-control function can be initiated.

In the method of the first embodiment, the determining comprises determining by a network node that performs a master radio-resource-control function.

In the method of the first embodiment, the determining that the slave radio-resource-control function is to be initiated comprises determining during at least one of a radio leg establishment and a radio leg reconfiguration.

In the method of the first embodiment, the determining that the slave radio-resource-control function is to be initiated comprises determining that a processing load of the network node has exceeded a first threshold.

In the method of the first embodiment, the determining that the slave radio-resource-control function is to be initiated comprises determining that a latency of an interface between the network node and the access point cannot meet fast radio-resource-control requirements.

In the method of the first embodiment, the determining that the slave radio-resource-control function is to be initiated comprises determining that a cell of the radio leg is deployed by a network operator different than a network operator of the network node, in accordance with a multi-tenancy policy.

In the method of the first embodiment, the determining that the slave radio-resource-control function is to be initiated includes determining a cell of the radio leg. The cell corresponds to a cell that is controlled by the access point. The determining that the slave radio-resource-control function is to be initiated includes determining a cell load of the cell, and determining that the cell load does not exceed a second threshold.

In the method of the first embodiment, the determining comprises determining that the slave radio-resource-control function is to be initiated based on a user equipment measurement report on the radio leg.

In the method of the first embodiment, the method may also include receiving a request to initiate the slave radio-resource-control function. The determining is initiated by receiving the from the access point. The request is initiated by at least one of a random access channel procedure, a service flow configuration, a service flow reconfiguration, and a radio leg reconfiguration.

In the method of the first embodiment, the method may also include coordinating a division of duties between the network node and the access point regarding a handling of a radio resource control procedure.

According to a second embodiment, an apparatus may include at least one processor. The apparatus may also include at least one memory including computer program code. The at least one memory and the computer program code may be configured, with the at least one processor, to cause the apparatus at least to determine that a slave radio-resource-control function is to be initiated. The slave radio-resource-control function is performed by an access point. The apparatus may also be caused to transmit a message to the access point. The message comprises at least one of a request to initiate the slave radio-resource-control function and a confirmation that the slave radio-resource-control function can be initiated.

In the apparatus of the second embodiment, the apparatus performs a master radio-resource-control function.

In the apparatus of the second embodiment, the determining that the slave radio-resource-control function is to be initiated comprises determining during at least one of a radio leg establishment and a radio leg reconfiguration.

In the apparatus of the second embodiment, the determining that the slave radio-resource-control function is to be initiated comprises determining that a processing load of the apparatus has exceeded a first threshold.

In the apparatus of the second embodiment, the determining that the slave radio-resource-control function is to be initiated comprises determining that a latency of an interface between the apparatus and the access point cannot meet fast radio-resource-control requirements.

In the apparatus of the second embodiment, the determining that the slave radio-resource-control function is to be initiated comprises determining that a cell of the radio leg is deployed by a network operator different than a network operator of the network node, in accordance with a multi-tenancy policy.

In the apparatus of the second embodiment, the determining that the slave radio-resource-control function is to be initiated includes determining a cell of the radio leg. The cell corresponds to a cell that is controlled by the access point. The determining that the slave radio-resource-control function is to be initiated may also include determining a cell load of the cell. The determining that the slave radio-resource-control function is to be initiated may also include determining that the cell load does not exceed a second threshold.

In the apparatus of the second embodiment, the determining includes determining that the slave radio-resource-control function is to be initiated based on a user equipment measurement report on the radio leg.

In the apparatus of the second embodiment, the apparatus is further caused to receive a request to initiate the slave radio-resource-control function. The determining is initiated by receiving the request from the access point. The request is initiated by at least one of a random access channel procedure, a service flow configuration, a service flow reconfiguration, and a radio leg reconfiguration.

In the apparatus of the second embodiment, the apparatus is further caused to coordinate a division of duties between the apparatus and the access point regarding a handling of a radio resource control procedure.

According to a third embodiment, a computer program product may be embodied on a non-transitory computer readable medium. The computer program product may be configured to control a processor to perform a method of the first embodiment.

According to a fourth embodiment, a method may include receiving, by a user equipment, a radio-resource-control measurement control information. The radio-resource-control measurement control information identifies a list of cells for the user equipment to monitor, and the radio-resource-control measurement control information is received from an access point. The method may also include configuring a slave radio-resource-control function.

In the method of the fourth embodiment, the method may further include transmitting a radio-resource-control measurement report to the access point. The access point determines that the slave radio-resource-control function is to be initiated. The method may also include receiving a radio-resource-control reconfiguration information from the access point.

In the method of the fourth embodiment, the receiving the radio-resource-control reconfiguration information may include receiving at least one of the slave radio-resource-control configuration information and a radio-resource-control coordination information.

In the method of the fourth embodiment, the receiving the radio-resource-control reconfiguration information may include receiving an indication of the properties of the slave radio-resource-control that is to be configured.

In the method of the fourth embodiment, the method may also include detecting a conflict between different radio-resource-control configurations. The method may also include reporting the detected conflict.

In the method of the fourth embodiment, the method further includes reporting that a radio-resource-control reconfiguration has been completed. The completion of slave radio-resource-control reconfiguration is reported.

According to fifth embodiment, an apparatus may include at least one processor. The apparatus may also include at least one memory including computer program code. The at least one memory and the computer program code may be configured, with the at least one processor, to cause the apparatus at least to receive a radio-resource-control measurement control information. The radio-resource-control measurement control information identifies a list of cells for the user equipment to monitor. The radio-resource-control measurement control information is received from an access point. The apparatus may also be caused to configure a slave radio-resource-control function.

In the apparatus of the fifth embodiment, the apparatus is further caused to transmit a radio-resource-control measurement report to the access point. The access point determines that the slave radio-resource-control function is to be initiated. The apparatus may also be caused to receive a radio-resource-control reconfiguration information from the access point.

In the apparatus of the fifth embodiment, the receiving the radio-resource-control reconfiguration information may include receiving at least one of the slave radio-resource-control configuration information and a radio-resource-control coordination information.

In the apparatus of the fifth embodiment, the receiving the radio-resource-control reconfiguration information comprises receiving an indication of the properties of the slave radio-resource-control that is to be configured.

In the apparatus of the fifth embodiment, the apparatus is further caused to detect a conflict between different radio-resource-control configurations. The apparatus may also be caused to report the detected conflict.

In the apparatus of the fifth embodiment, the apparatus is further caused to report that a radio-resource-control reconfiguration has been completed. The completion of slave radio-resource-control reconfiguration is reported.

According to a sixth embodiment, a computer program product may be embodied on a non-transitory computer readable medium. The computer program product configured to control a processor to perform a method of the fourth embodiment.

According to a seventh embodiment, an apparatus may include determining means that determines that a slave radio-resource-control function is to be initiated. The slave radio-resource-control function is performed by an access point. The apparatus may also include transmitting means that transmits a message to the access point. The message comprises at least one of a request to initiate the slave radio-resource-control function and a confirmation that the slave radio-resource-control function can be initiated.

According to an eighth embodiment, an apparatus may include receiving means that receives a radio-resource-control measurement control information. The radio-resource-control measurement control information identifies a list of cells for the user equipment to monitor, and the radio-resource-control measurement control information is received from an access point. The apparatus also includes configuring means that configures a slave radio-resource-control function.

BRIEF DESCRIPTION OF THE DRAWINGS

For proper understanding of the invention, reference should be made to the accompanying drawings, wherein.

DETAILED DESCRIPTION

Figure 1:
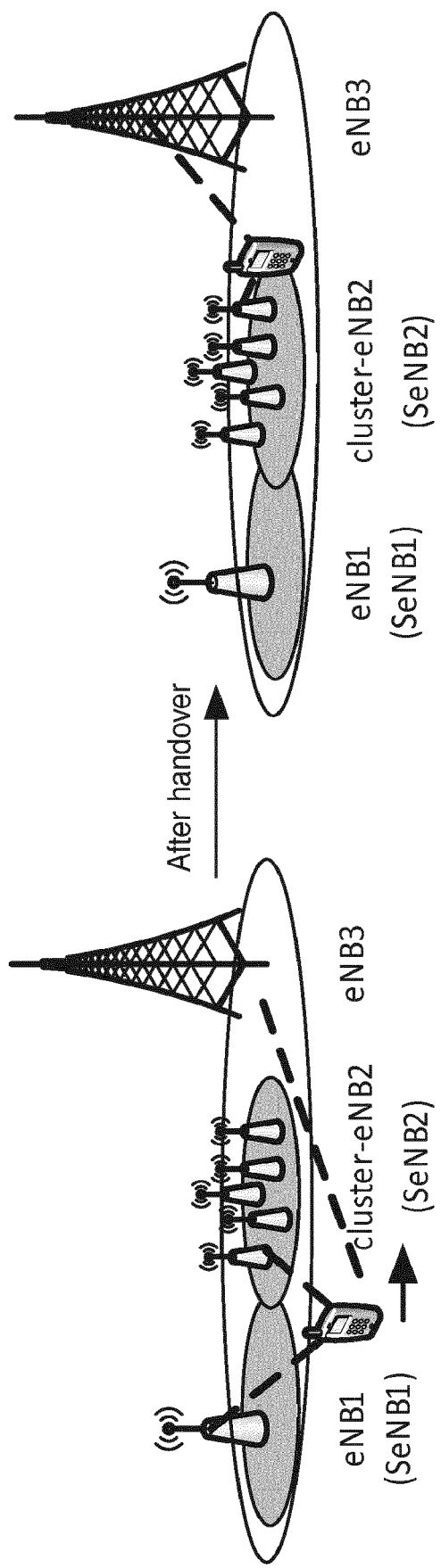
FIG. 1 illustrates an example multi-connectivity scenario.

Certain embodiments of the present invention may relate to implementing radio resource control of multi-connectivity. 5G systems are intended to utilize different spectrum ranges, such as spectrum ranges below 6 GHz, cmWave spectrum ranges, and mmWave spectrum ranges, for example. 5G systems may utilize different radio interfaces (multi-RIs) because the physical nature of each spectrum range may be different from the physical nature of the other spectrum ranges. When supporting multi-Ms in 5G, the different Ms may have different functionality and configuration parameters. Thus, it may be important to support separate Radio Access Network (RAN) level configurations for the different Ms. Supporting separate RAN level configurations for different Ms may also enable the development of different Ms that are not dependent upon each other in different timelines. Therefore, there may be a need for a RAN control plane architecture that can adaptively support multi-RIs and multi-connectivity in an efficient and flexible way.

When a user equipment (UE) is in an LTE dual connectivity (DC) scenario, a secondary eNB (SeNB) may control radio resources and may be primarily responsible for radio resource management of a corresponding cell. However, a final Radio Resource Control (RRC) message may be generated by a master eNB (MeNB), and the final RRC message may be sent to a UE. The final RRC message may be sent to the UE over a radio link of a cell that is managed by the MeNB. With this approach of implementing LTE DC, certain drawbacks may exist. Utilizing the above-described approach may result in an increased configuration delay, an increased amount of effort expended for controlling reconfiguration timing, an increased processing overhead of the MeNB, and/or an increased signalling overhead on the radio link of the MeNB and the interface between the MeNB and the SeNB, as compared to other possible approaches. Additionally, the MeNB may need to be aware of the details of the SeNB. For example, the MeNB may need to know details that are specific to the radio interface of the SeNB. The MeNB may determine these details, for example, by decoding measurement reports containing dual connectivity events.

When implementing multiple RIs in the context of 5G, with more radio connectivity links and with multi-tenancy support, certain additional issues may need to be addressed. For example, one additional issue may be that an entity that hosts the master control functions may be more easily overloaded due to the fact that each UE may be supporting more radio legs. A radio leg may generally refer to a set of radio resources under the control of an access point. The access point may control a similar type of radio interface such as, for example, cmW, mmW, and macro interfaces. An access point may provide a plurality of radio leg configurations to the UE for further use. Another additional issue may be that the air interface of the entity that hosts the master control functions may be overloaded due to an increased amount of reconfigurations due to SeNB addition/removal/modification. Another additional issue may be that, with the implementation of dynamic routing in a Network Convergence Sub-layer (NCS) of 5G for multi-connectivity, the back and forth signalling of messages may introduce unnecessary configuration delay and signalling overhead on backhaul. For example, the signalling may introduce delay and signalling overhead if a final RRC message is generated in the master RRC entity (as in accordance with implementing LTE DC) but is finally transmitted on a radio leg that is managed by a slave RRC entity.

FIG. 1 illustrates a multi-connectivity scenario. In this multi-connectivity scenario, configuring independent RRC for certain connectivity may be beneficial. An independent RRC may generally refer to a separate Radio Resource Control (RRC) connection, a separate radio configuration (and specific messages to alter the configuration), or a radio configuration identified by a radio configuration identity which is unambiguous for the UE to operate upon. In the example of FIG. 1, a UE may be initially in LTE DC with eNB1 and eNB3. eNB1 may act as an SeNB1 as in LTE DC. In this example, no (slave) RRC instance may be added for eNB1 because all the RRC messages are transmitted via an MeNB (as in LTE dual connectivity), where, for example, eNB3 may act as the MeNB. An RRC instance may generally refer to a slave RRC (where the slave RRC could be implemented as a radio configuration under the control of the master RRC or could also be implemented as a separate RRC connection) if this is a different radio access technology such as, for example, 3G, 4G, or even WiFi. Suppose that cluster-eNB2 (where eNB2 may also correspond to a multi-controller or an RNC-like controller that controls a set of access points assigned to it) is added as an SeNB2 when the UE enters into a zone corresponding to cluster-eNB2, and an RRC instance may be added in the SeNB2. The RRC instance can manage an autonomous mobility procedure and bearer configuration within the cluster-eNB2. The autonomous mobility and bearer configuration procedure may use a cluster-eNB2 radio link rather than using an eNB3 radio link. One example of autonomous mobility is that the UE movement under the cluster eNB is not directly visible to the master RRC, where, for example, the handover preparation and execution is under the slave RRC, but the master RRC is only informed by the slave RRC after the handover preparation/execution has been decided.

The above arrangement of FIG. 1 enables the following flexibility. The arrangement may enable multi-connectivity by adding SeNB2 to an already established LTE-DC arrangement between eNB1 and eNB3. With an arrangement that includes SeNB2, UE mobility within SeNB2 may be autonomously controlled without involvement of MeNB. For example, with this arrangement, MeNB resources need not be utilized when the UE is autonomously managed by SeNB, neither does the MeNB have to implement any SeNB2 radio interface awareness. With the arrangement, it may be possible to reconfigure a radio leg of SeNB2 independently of the LTE-DC. When the UE fully leaves the coverage area of eNB1, eNB2 may become the SeNB upon transmission of a single reconfiguration message. When the UE is still connected to the cluster eNB, the slave RRC of the cluster eNB is the entity sending the reconfiguration message, and the UE is the receiver. Once the UE leaves the coverage of the eNB1, as one possible option, MeNB could switch eNB2 as the SeNB in another reconfiguration message to the UE, effectively disabling the slave RRC and falling back to LTE dual connectivity. In LTE dual connectivity, there is generally no master and slave RRC roles defined in the 3GPP specification.

Figure 2A:
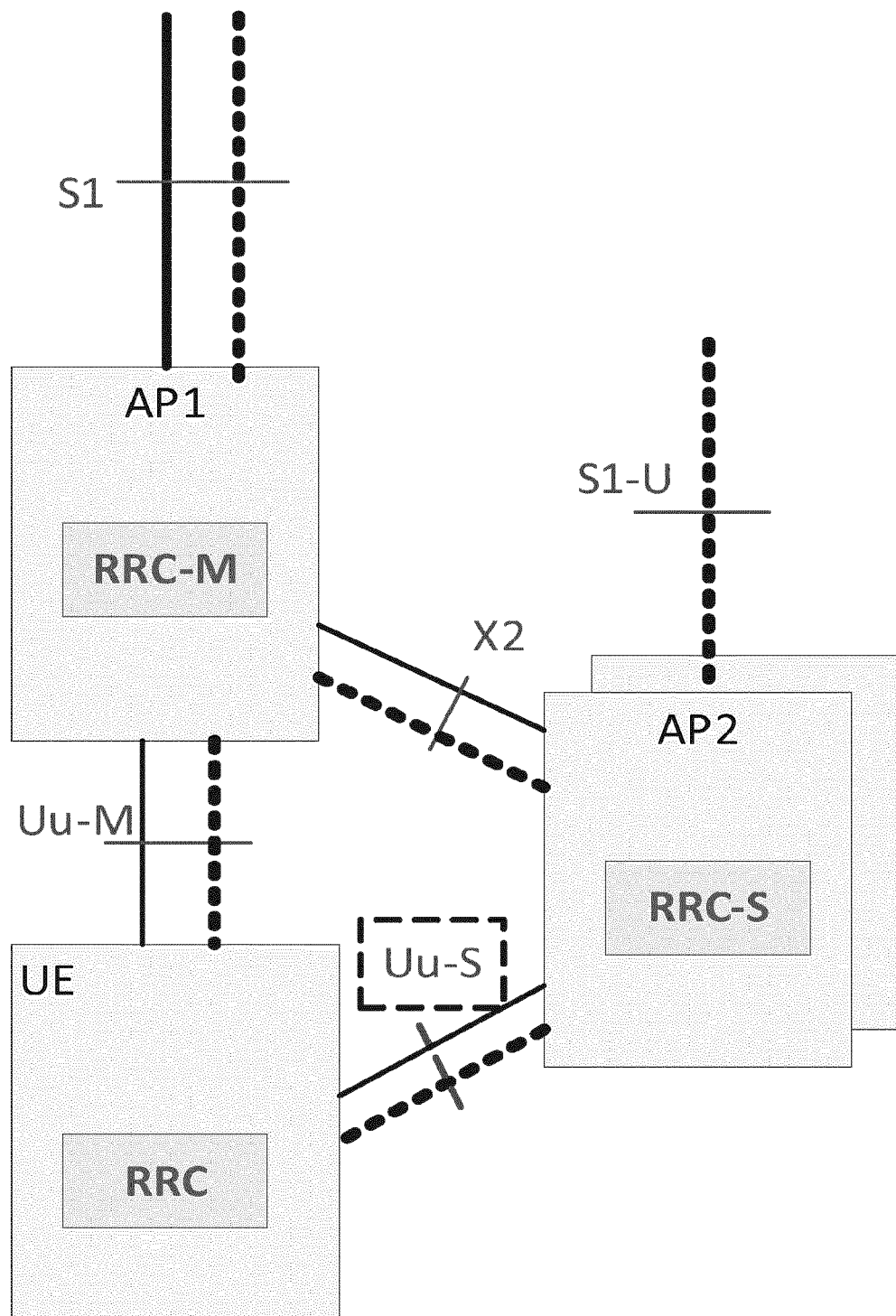
FIG. 2(a) illustrates an example view of a master Radio Resource Control (master-RRC) and a slave-RRC.

FIG. 2(*a*) illustrates an example view of a master-RRC and a slave-RRC. FIG. 2(*a*) illustrates a generic architecture for showing the master and slave RRC roles and the Uu interface relationship with the UE. In comparison with FIG. 1, the eNB1 and eNB2 are access points. Uu-M and Uu-S may be RRC signalling paths from the master and slave RRC, respectively, to the UE. The dotted line may correspond to a user plane path, and the solid line may be a control plane path. With regard to the relationships between the eNBs of FIG. 1 and the APs of FIG. 2(a), AP1 of FIG. 2(a) may correspond to eNB3 of FIG. 1, and AP2 of FIG. 2(a) may correspond to eNB2 of FIG. 1. With regard to the role of the master-RRC, the master-RRC may function as a Mobility anchor (for S1-C anchoring, for example). Further, all S1 procedures may be terminated at the master-RRC. The master-RRC may also perform radio connection management (and coordination with the slave-RRC). The master-RRC may also perform UE state management.

With regard to the role of the slave-RRC, the slave-RRC may provide local configuration (by translating requests from M-RRC to local resources). The slave RRC may provide fast reconfiguration of local configuration (the reconfiguration may be pre-agreed to with the master-RRC) and provide corresponding reconfiguration directly to UE.

It may be desirable to implement a multi-connectivity architecture that supports the following features. First, it may be desirable to evolve the protocol architecture so that the MeNB is not burdened with an ASN.1 protocol encoding/decoding of RRC messages. The slave-RRC is able to trigger radio reconfiguration (e.g., the triggering of either minor and/or pre-agreed to reconfigurations) with the UE directly, reducing the burden of the master-RRC for protocol message encoding/decoding. Further, the multi-connectivity architecture could be useful to reconfigure service flows (without involving the MeNB), when a service flow is mapped to the access point that is being controlled by a slave RRC (or controlled by, for example, an individual access point, a multi-controller, and/or an RNC-like controller).

For scenarios with non-collocated access points, the slave-RRC may assist in supporting both single and multiple radio (and even RRC) connections. For scenarios with non-collocated access points, a generic model may work in an LTE-DC compatible mode, with suitable radio protocol configuration options turned on and off. This model may support the use cases where the radio connections are mutually exclusive from each other (for example, where the UE capability does not cross over radio interfaces with different radio interface implementations in the 5G cmW and mmw-wide areas). Then, parallel reconfigurations could be simultaneous. This model may also support fast and independent reconfigurations (for more dynamic quality-of-service/quality-of-experience, the slave RRC could trigger setup/modification and release of sub-flows within a service flow without MeNB involvement).

Certain embodiments may be directed to a 5G multi-connectivity scenario, from a RAN control plane perspective. Certain embodiments may propose a flexible context-aware RRC control mechanism, and certain embodiments may propose corresponding coordination procedures for a multi-radio and a multi-service 5G architecture.

Certain embodiments may be directed to implementing coordinated RRC in a multi-radio and a multi-connectivity scenario. An entity may host the master RRC control functions (the master-RRC). As shown above by FIG. 2(a), the master-RRC may be located in either one of the 5G Access Points (APs) or in a RAN aggregator entity. The master-RRC may coordinate the RRC control among multiple radio legs/links. By performing coordination of RRC control among multiple radio legs, the signalling may be more robust. Another entity may host slave RRC control functions (the slave-RRC). The slave-RRC may be located in some of the remaining 5G APs, and the slave-RRC may possibly manage radio leg-specific control and may manage procedures directly towards UE, if the slave-RRC is established under the control of the master-RRC.

Certain embodiments are directed to a flexible and context-aware RRC control and coordination mechanism that may be utilized in conjunction with 5G RAN architecture, and certain embodiments may include the following features.

Figure 2B:
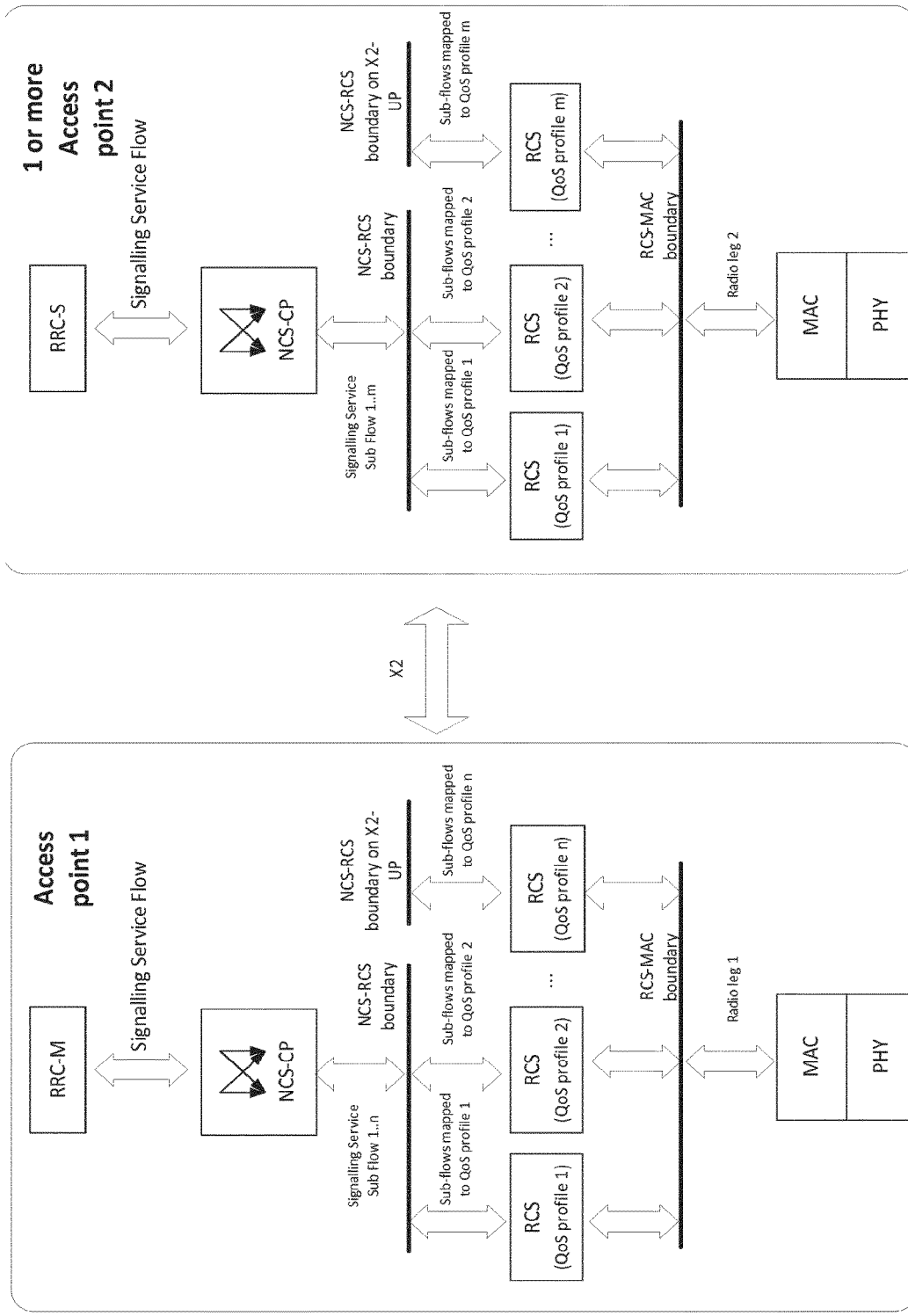
FIG. 2(b) illustrates radio-resource control and network-convergence-sublayer interaction in a master and slave-RRC model.
Figure 2C:
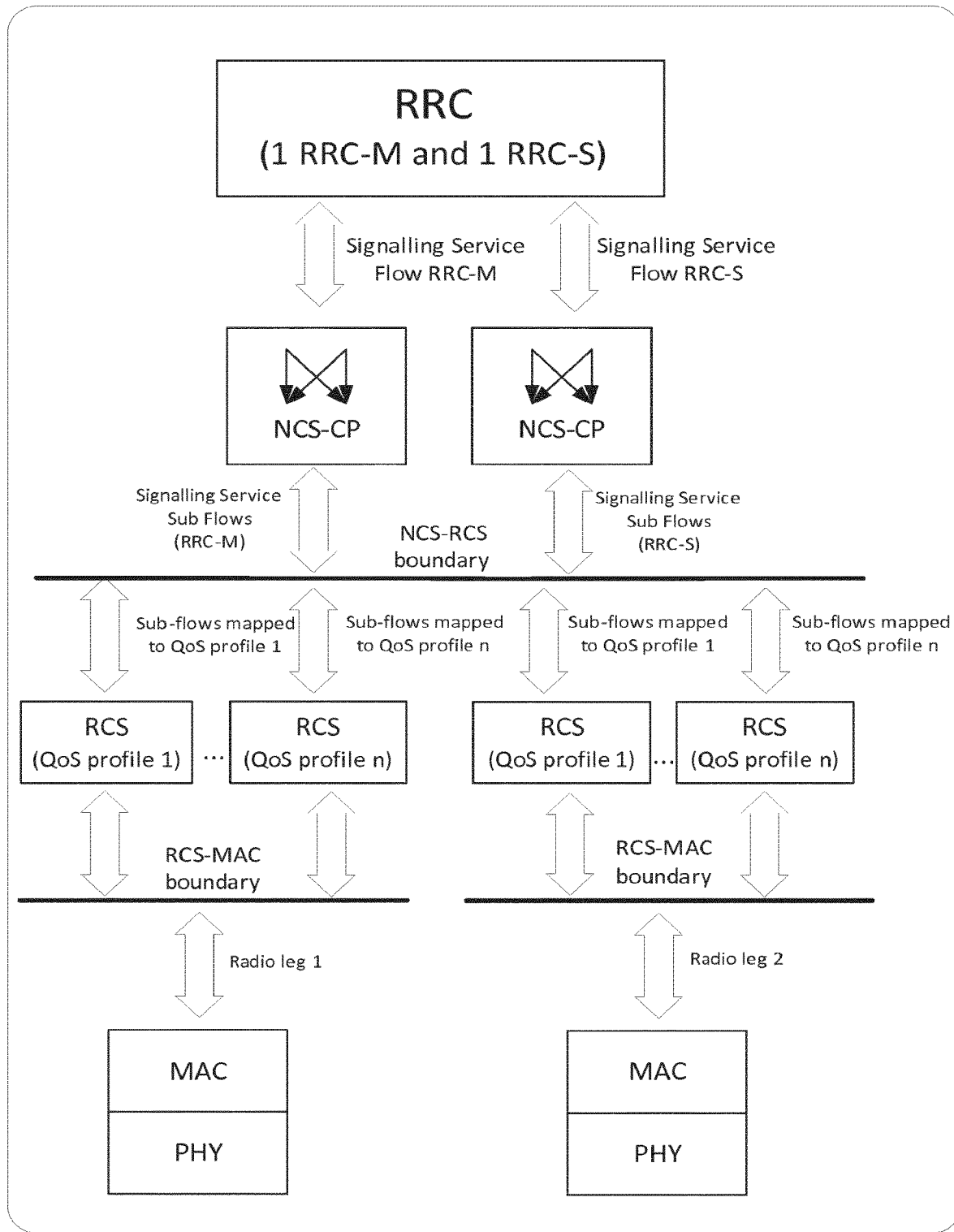
FIG. 2(c) illustrates radio-resource control and network-convergence-sublayer interaction in a master and slave-RRC model.

FIG. 2(b) and FIG. 2(c) illustrates possible implementations for how the RRC-M and the RRC-S may be able to send RRC signalling messages to the UE. FIG. 2(b) and FIG. 2(c) illustrate how the Uu-M and the Uu-S interfaces may be implemented. The Network Convergence Sublayer (NCS) may be the sublayer that utilizes the radio legs, and that is established towards the UE from one or more access points. A radio leg may correspond to a set of Radio-link-Convergence-Sublayer/Medium-Access-Control/Physical-layer (RCS/MAC/PHY) resource configuration. In 5G, the NCS may correspond to the improved Packet Data Convergence Protocol (PDCP) sublayer. The RCS may be the improved RLC sublayer, which provides the functionalities of the Radio Link Control (RLC) sublayer in a 5G network.

FIG. 2(b) illustrates an example of radio-resource control and NCS interaction in a master and slave-RRC model from the network point of view. Each AP instantiates one NCS (per RRC-M or RRC-S). Each NCS may be linked (by RRC signalling) to a plurality of sub-flows (the example here shows RRC-M having n sub-flows and BRC-S having m sub-flows). The sub-flows may be for signalling sub-flows pertaining to a main path of RRC messages. A sub-set of sub-flows may be allocated for a diversity path (each within RRC-M and RRC-S). In this example, dedicated sub-flows may be established for the diversity path, another option may reuse the main path to also carry diversity signalling. The sub-flows are further mapped to RCS instances (which may correspond to a given QoS profile for example). Finally one or more RCS instances are processed by the MAC/PHY on a Radio leg.

FIG. 2(c) illustrates an example of radio-resource control and NCS interaction in a master and slave RRC model. RRC signalling may be used to inform the UE about: (1) the NCS configuration for RRC-M and RRC-S, and/or (2) the mapping of main and diversity paths per RRC-M and RRC-S.

NCS may use the configured sub-flows to send and receive signalling traffic. An RRC layer may be unaware of how the signalling transport occurs at the NCS layer. However, the RRC layer may need to be aware if the protocol message originated from the RRC-M or the RRC-S layer. From the UE point of view, the RRC uses the NCS in the same manner as LTE RRC uses the PDCP layer. In this example, dedicated sub-flows are established for diversity path, an another option is to reuse the main path to also carry diversity signalling.

The Master-RRC may determine if the slave-RRC needs to be initiated or not during an establishment of an additional radio leg or during radio leg reconfiguration Establishing an additional radio leg may refer to allocating more radio resources to the UE by the slave RRC. For example, referring to FIG. 1 and FIG. 3, when the UE moves to coverage of eNB2/AP2, the radio leg/link may be established between the UE and eNB2/AP2, in addition to the radio leg/link between the UE and eNB3/AP1. In certain embodiments, the established/reconfigured radio leg may use the same or different 5G RIs as the other radio legs. The determination of whether the slave-RRC needs to be initiated or not may be based on the determined capability of the UE, based on a determination of whether multi-RRC stack support exists, and based on which network entities that the master-RRC and the slave-RRC are located within. For example, certain embodiments may avoid initiating the slave-RRC if the slave-RRC is co-located with the master-RRC. Certain embodiments may determine whether the slave-RRC needs to be initiated based upon a determined processing load of each network entity and/or a determined latency of an interface between the network entity of the master-RRC and the entity of the slave-RRC. With regard to basing the determination of whether the slave-RRC needs to be initiated on the processing load of each network entity, certain embodiments may initiate the slave RRC if the processing load of the network entity of the master-RRC is higher than a certain threshold. With regard to basing the determination of whether the slave-RRC needs to be initiated on the latency of the interface between the network entity of the master-RRC and the network entity of the slave-RRC, certain embodiments may avoid initiating the slave-RRC if the interface between the two entities is fast enough such that the configuration delay that results from using the master-RRC (to configure the UE) is negligible.

Certain embodiments may determine whether the slave-RRC needs to be initiated based on whether the cells that the radio legs are connected to are involved with multi-tenancy. For example, certain embodiments may initiate the slave-RRC if a cell of a radio leg is deployed by another network operator and is shared by the UE's operator under a multi-tenancy policy. Certain embodiments may determine whether the slave-RRC needs to be initiated based on characteristics of an RI of a radio leg, and/or based on a load of a cell that each radio leg is connected to. With regard to basing the determination on characteristics of an RI of a radio leg, the slave-RRC may be initiated if the RI of the radio leg needs a fast configuration and/or is independent from other radio legs. With regard to basing the determination on the load of the cell that each radio leg is connected to, certain embodiments may avoid initiating the slave-RRC if the cell load that is related to the radio leg is higher than a certain threshold.

Certain embodiments may determine whether the slave-RRC is to be initiated based on a radio link quality of each radio leg and/or based on service flow characteristics during radio leg reconfiguration. With regard to basing the determining of whether the slave-RRC needs to be initiated on the radio link quality of each radio leg, certain embodiments may initiate the slave-RRC if the radio leg can provide good link quality. With regard to basing the determination of whether the slave-RRC needs to be initiated on the service flow characteristics during radio leg configuration, certain embodiments may initiate the slave-RRC for service flow that is required to be ultra-reliable service flow. As such, the monitoring and configuring of each radio leg of an ultra-reliable service flow may be performed in a faster and more dependent fashion by the slave-RRC towards the UE directly.

Figure 3:
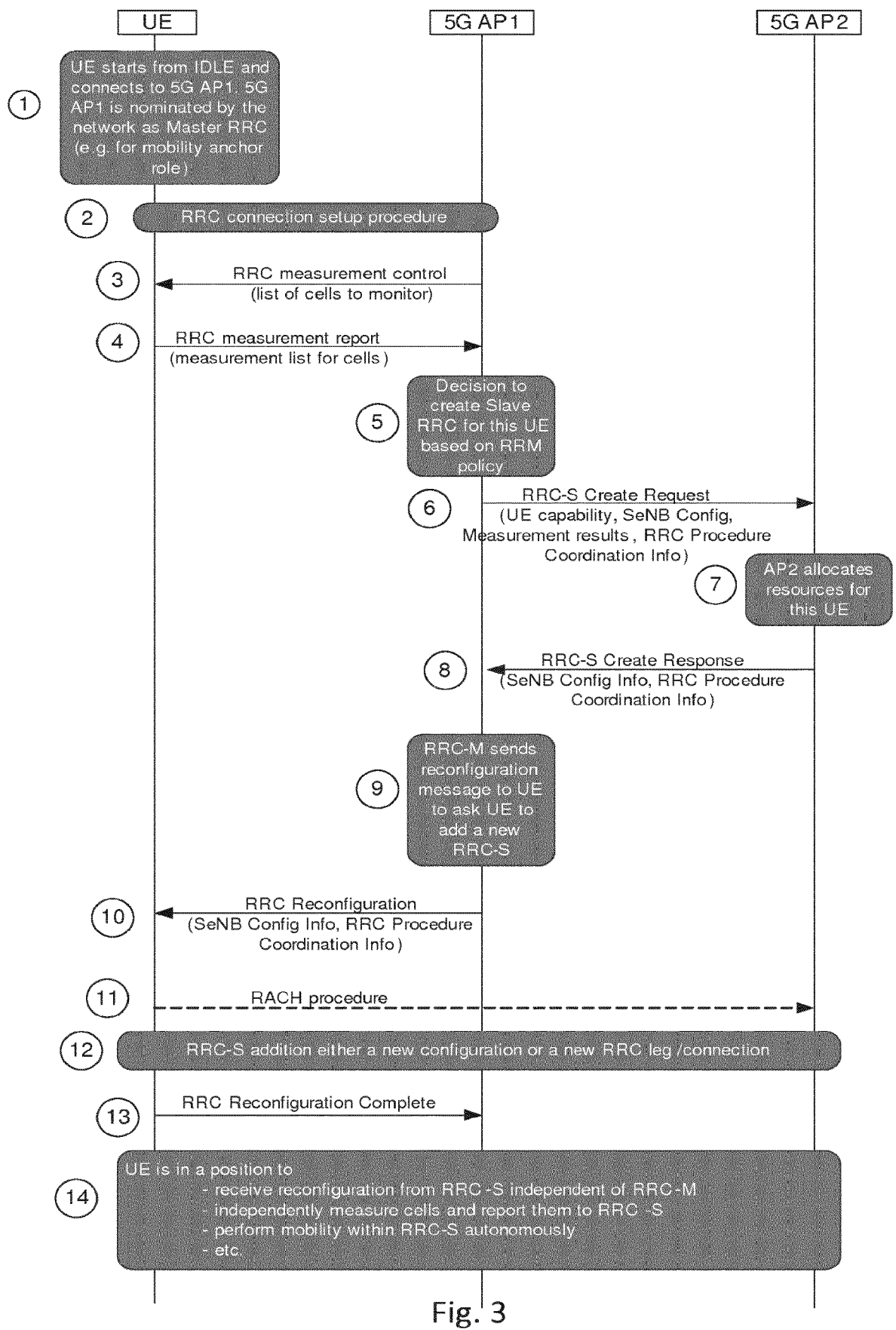
FIG. 3 illustrates a signaling flow of instantiating a slave-RRC in accordance with certain embodiments of the present invention.

With certain embodiments, the initiating/establishment of the slave-RRC may be initiated by the Master-RRC. FIG. 3 illustrates a signaling flow of instantiating a slave-RRC in accordance with certain embodiments of the present invention. The method of instantiating the slave-RRC may be invoked for intra-frequency/intra-band and inter-frequency/inter-band 5G cases. This method may also be used for non-5G radio access.

Referring to steps 1 and 2, a UE may typically start from an idle mode and may establish a standalone RRC connection with an Access Point (AP). The master RRC may be an AP that is based on some reference policy (the master RRC may perform a mobility anchor role, like a role which the MeNB takes on in dual connectivity). The UE may have an RRC connection with the Master RRC (implemented/hosted within AP1).

Referring to step 3, the Master RRC may provide the UE with a list of cells to measure/monitor.

Referring to step 4, the UE may measure the list of cells and report them back to the network.

Referring to steps 5 and 6, the Master RRC may identify an AP that could host the Slave RRC and forward some parameters on the backhaul connection. Specifically, the Master RRC may send some parameters to the Slave RRC entity. These parameters may identify the UE capability, a list of independently triggerable RRC procedures, an optional measurement report, and some more detailed control information. For example, the parameters may identify whether the Slave RRC could host an independent RRC connection or a radio leg that is associated with an RRC instance (here, the slave RRC instance).

Referring to steps 7 and 8, the slave RRC may allocate resources back to the Master RRC. In the response, typically, there may be a configuration towards the UE and, if needed, there would be some further changes in the configuration from the Slave RRC towards the Master RRC.

Referring to steps 9 and 10, the master RRC may provide an indication to the UE in the RRC message. The indication may relate to the properties of the slave RRC.

Referring to step 11, the UE may perform a Random Access Channel (RACH) access request (which may be non-contention based) towards the slave RRC. In another embodiment, the UE may perform a contention based random access towards the strongest cell based on the measurement.

Referring to step 12, the slave RRC may either be implemented as an extension of the master RRC (with an added slave RRC instance) or as an independent RRC connection (but the slave RRC may still be coordinated inside the network, without UE knowledge).

Referring to step 13, the UE may send an RRC reconfiguration complete message to the Master RRC, indicating that the Slave RRC configuration was successful. With another embodiment, step 13 may include another option where AP2 gives an indication to AP1 for the RRC Reconfiguration Complete, after the UE successfully completes the S-RRC addition in step 12.

Referring to step 14, the UE may be in a position to receive reconfiguration from a slave RRC, independent of the master RRC. The UE may independently measure cells and report the measurements to the slave-RRC. The UE may autonomously perform mobility within an area that the slave RRC controls.

With another embodiment, a UE could already be in a dual connectivity scenario (not starting from IDLE but with a baseline of LTE dual connectivity), and then the UE may want to add another AP radio resource because the UE finds AP resources to be suitable.

With another embodiment, a UE may independently contact AP2 after Step 3 above. In that case, the configuration of the Slave RRC is independently received by the UE from the Slave RRC (and the negotiation may occur inside the network).

With another embodiment, a Slave RRC change may occur independently of the Master RRC. The Master RRC may not be involved in the change procedure. From the network perspective, this change procedure may help in cases where the Slave RRC connection is hosted as a part of an independent network (for example, a non-5G network).

The Master-RRC may initiate the establishment of the slave-RRC based on UE measurement reports relating to a corresponding radio leg. With this embodiment, the master-RRC may use the above-described criteria to determine whether the slave-RRC should be established or not.

The UE may complete an RRC connection setup procedure with AP1. AP1 may be set as the default host of the master-RRC. A serving access point (such as AP1) may decide to add AP2 into an active set, and the serving access point may request AP2 (where AP2 may be selected based on UE measurement reports) to provide dedicated radio resources as well as L2 configurations.

Signalling radio bearer (SRB) configurations may deliver slave RRC messages. A message such as, for example, a "Slave RRC connection setup complete" message may use security configurations and SRB to trigger slave-RRC creation in AP2.

With another embodiment, the establishment of slave-RRC may be initiated by a "pre"-slave-RRC. A pre-slave-RRC may refer to an RRC entity/instance that is initiated by SeNB/AP2, but has not been confirmed by the master RRC (M-RRC) in AP1. The M-RRC will determine if the pre-slave-RRC can become a real slave RRC or not. The reason to have the pre-slave-RRC is that, in this option, the UE first contacts another AP (i.e., such as AP2 in FIG. 3) with a random access procedure (but not by reporting the measurement of other cells to M-RRC in AP1). The AP2 may use the local information (in accordance with the above-described criteria) to determine if S-RRC should be initiated or not, rather than sending the local information to AP1 where M-RRC is located.

Figure 4:
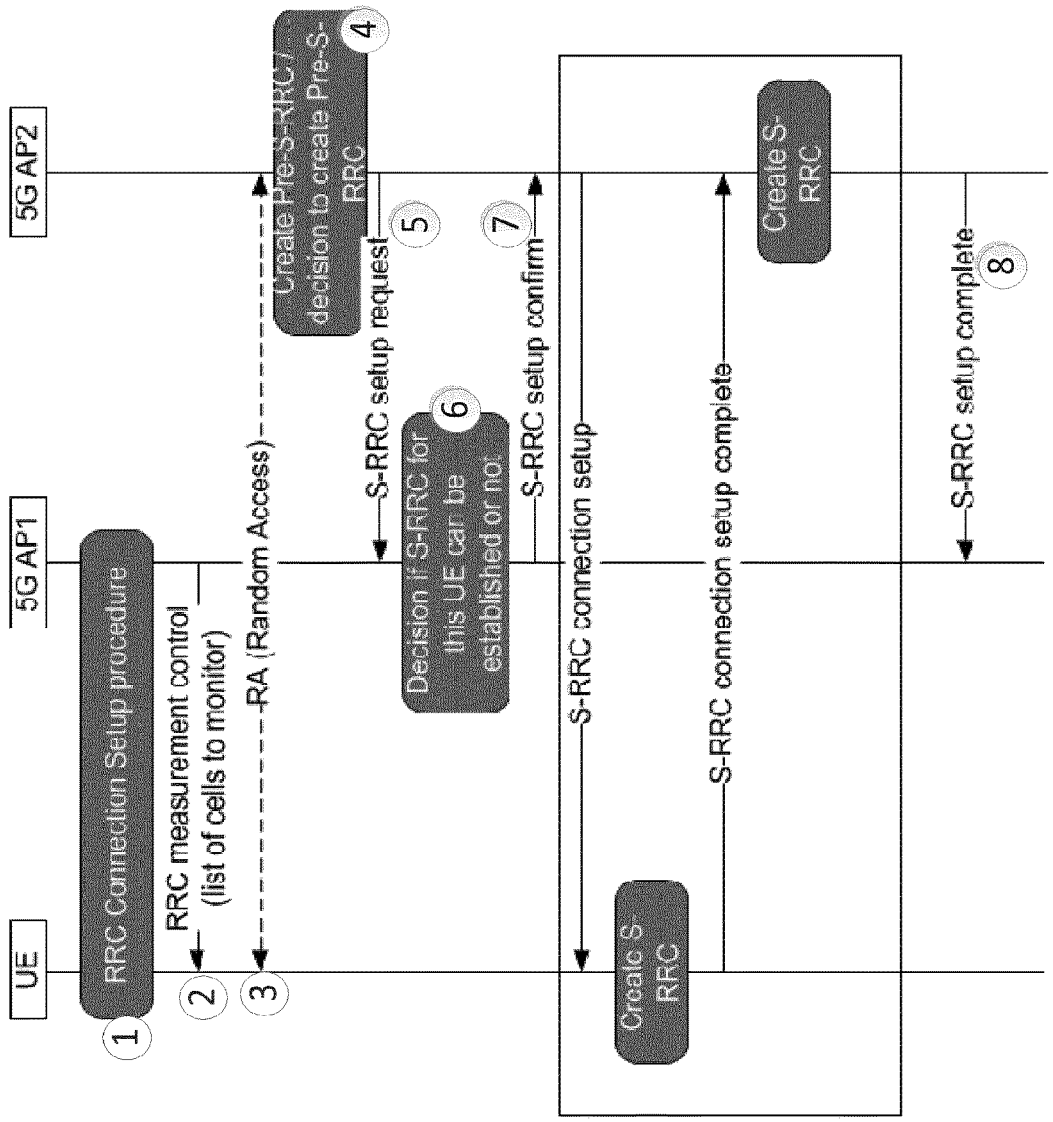
FIG. 4 illustrates a signaling flow in accordance with certain embodiments of the invention.

FIG. 4 illustrates a signalling flow in accordance with certain embodiments of the present invention. Referring to step 1, an RRC connection may be established between the UE and 5G AP1. Referring to step 2, 5G AP1 may provide the UE with a list of cells to measure/monitor. In contrast to the signalling flow of FIG. 3, with the signalling flow of FIG. 4, the UE may be configured to directly access suitable cells, instead of sending measurement reports to AP1. Referring to step 3, based on a configuration from AP1, the UE finds a suitable cell and accesses the cell by a random access procedure. During the random access procedure, the UE may indicate that the M-RRC is located at AP1. Step 4 may be an optional step. Referring to step 4, AP2 may check if Pre-S-RRC should be established or not, and the checking may be based on the information that AP2 has received. Referring to step 5, AP2 may send an S-RRC setup request to AP1. Referring to step 6, the M-RRC determines if the S-RRC should be established in the AP2. Referring to step 7, the M-RRC responds to AP2 regarding whether S-RRC is to be established or not. Referring to step 8, after S-RRC is successfully established, S-RRC/AP2 indicates the successful establishment to M-RRC/AP1. The slave-RRC may be initiated based upon, for example, the performing of a random-access channel (RACH) procedure for radio leg setup, the performing of a service flow (re-)configuration, and/or the performing of a radio leg reconfiguration. With this embodiment, the "pre"-slave-RRC may use some of the above-described criteria to determine whether the slave-RRC may be initiated. However, the initiating of the slave-RRC by the "pre"-slave-RRC may need to be confirmed via the Master-RRC, in order to confirm that the initiated slave-RRC should be kept.

The Master-RRC may coordinate a division of duties in handling RRC procedures, where the handling of RRC procedures may be divided between the master-RRC and the slave-RRC. The coordination can be performed on-the-fly, on a UE or service flow basis. The Master-RRC may coordinate the division of duties to determine which RRC message, which RRC procedure, and/or which RRC procedure group may be performed by the slave-RRC directly with the UE, and which ones should involve the master-RRC.

As described above, certain embodiments may use the above-described criteria to determine whether the slave-RRC needs to be initiated. For example, the slave-RRC may be configured to perform more RRC procedures if a link quality of a radio leg is good and/or if a cell load is low. Alternatively, the slave-RRC may be configured to perform less RRC procedures if multiple radio legs have the same RI, and if the radio legs are dependent upon each other.

The coordination of the division of duties between the slave-RRC and the master-RRC may be performed at a network side, over the interface (such as an X2 interface in LTE) between relevant network entities. For example, the master-RRC may determine that an RRC procedure is to be initiated towards the UE via a certain slave-RRC. An intended RRC message that is initiated from the Master-RRC may include all the detailed control information (i.e., a message that conveys full information), part of the detailed control information (i.e., a message that conveys partial information), or none of the detailed control information (i.e., a message that is empty of information), so that the slave-RRC may then make a subsequent determination/decision. The slave-RRC may decide either to forward the RRC message in its current form, or the slave-RRC may decide to add further information to the RRC message. The slave-RRC may add detailed control information to the message. The slave-RRC may then forward the RRC message to the UE, where such forwarding corresponds to providing a full, partial, or empty indication in the RRC message.

A message that conveys full information may indicate that corresponding RRC procedures should be terminated in the Master-RRC; a message that conveys partial information may indicate that corresponding RRC procedures should be terminated in both the Master-RRC and the Slave-RRC; a message that is empty of information may indicate that the corresponding RRC procedures should be terminated in the Slave-RRC. The Master-RRC can, of course, explicitly indicate to the Slave-RRC whether the Master-RRC and/or the Slave-RRC should be the termination point of the corresponding RRC message/procedure.

To facilitate the coordination between the master-RRC and the slave-RRC, NCS or NCS-X2 may be utilized, and an indication can also be used by NCS to determine which radio leg the RRC message should be transmitted to. A full and partial RRC message (that is initiated from the Master-RRC) may be a signal to the UE, which may be signalled in parallel by both the master-RRC and the slave-RRC. The UE may then respond to the earliest received message, or the UE may respond to both the master-RRC and the slave-RRC (for improved reliability).

In addition to performing a division of duties with regard to RRC procedures, the master-RRC may also indicate configuration constraints that are under the control of the slave-RRC, in order to avoid a UE capability violation. The slave-RRC may also request updating of the RRC procedure division, and the slave-RRC may also request updating of the configuration constraints.

Further, the UE may be configured to facilitate the coordination of master-RRC and slave-RRC configuration. For example, the UE may be configured to report the RRC configuration of each radio leg to the master-RRC, where the reporting may occur either periodically or may occur on an event-triggered basis. For example, the reporting may occur when detecting a conflict of different RRC configuration. Based on the UE's reporting, the master-RRC may determine a re-configuration of certain radio legs of the slave-RRC.

For RRC procedures that are under the control of a slave-RRC, the UE may be configured to use a corresponding radio leg for an uplink (UL) RRC message transmission. For RRC procedures that are under the control of the master-RRC, the UE may be configured by the master-RRC regarding which uplink (UL) RRC message can be transmitted via which radio leg. An uplink RRC message may also be transmitted via multiple radio legs. For example, the Master-RRC may first configure the UE to initiate RRC via the Slave-RRC, but the Master-RRC may configure the UE to use only the Master-RRC for certain specified unexpected events, or once per a certain configured period.

In one embodiment, the slave RRC is allowed to have autonomous operation in controlling the corresponding radio leg of the UE as much as possible. However, the master RRC may override any relevant configuration and control of the slave RRC, and, in this case, the master RRC may communicate with both the slave RRC at the network side and the corresponding RRC at the UE side for the overridden part. In this regard, with certain embodiments, the master RRC and the slave RRC at the network side and the corresponding RRC at the UE side may carry out a 3 party handshake/agreement whenever needed in order to synchronize their contexts; any one of them may initiate the handshaking.

With certain embodiments, the setup of the slave-RRC may be implemented by setting up a slave RRC connection or a slave signalling radio bearer (SRB). The slave RRC connection (or the slave SRB) may be linked to the corresponding radio leg that is managed by the slave-RRC. With certain embodiments, a slave-RRC specific entity may be instantiated on a UE side as well, if the UE has dual or multi-RRC protocol stack capability. With certain other embodiments, the master-RRC and the slave-RRC may be managed under one RRC connection or even under a same SRB. Under the same RRC connection/SRB, certain procedures may be managed by the master-RRC, and the other procedures may be managed by the slave-RRC, in accordance to the above-described division configuration. With this embodiment, the UE side may instantiate one RRC entity, which may be configured the responsible radio leg for each RRC message transmission. In one embodiment, the UE may have one RRC protocol instance which is able to process multiple simultaneous configuration messages from the master and the slave RRC.

In another embodiment, the UE may choose to implement the master and slave RRC instances as separate protocol instances so that, in effect, these instances are independent.

The signaling channel from the master RRC and the slave RRC may have to be independent. The radio resources corresponding to them may be allocated by the access point or controllers that instantiate the master and slave RRC instances.

The RRC procedure division between the master-RRC and the slave-RRC may be performed on a RRC message basis (for each RRC message), or on a RRC procedure basis (for each RRC procedure), and/or on a certain RRC procedure group basis. Further, with certain embodiment, a completely new set of RRC messages could be used to describe how a slave RRC could address the UE. One example of RRC procedures that may be managed by the slave-RRC may include: (1) radio configuration/reconfiguration messages related to the radio leg managed by the slave-RRC (so that the slave-RRC has the capability to handle the service flow configuration independently of the master-RRC) and/or (2) Slave-RRC managed radio leg related measurements, which can be independent of master-RRC controlled measurements.

The Master-RRC may initially explicitly request that the slave-RRC set up measurement for the UE (measurement control offloading). The Slave-RRC may specifically request the UE to not send measurement reports to the master-RRC. Certain embodiments may use independent radio-link failure (RLF) handling if the slave-RRC can recover from RLF faster than the recovery via the master-RRC. Certain embodiments may use independent slave-RRC related mobility control if such mobility control does not need master-RRC involvement.

In one embodiment, the master-slave roles of the RRCs may be passed or swapped on the fly between the master RRC and an associated slave RRC, for example, in case of unrecoverable radio-link failure (RLF) or handover (HO) or release of the radio leg corresponding to the master RRC. The master RRC may initiate the passing or swapping of the master-slave roles together with establishing or reconfiguring of the targeted slave RRC. The master-slave roles of RRCs may be associated with distinctive contexts such as some designated security keys or exclusive identities or procedures which are applied towards the UE. These contexts may be passed to the slave RRC via a direct network interface between the master RRC and the slave RRC, for example.

With certain embodiments, allowing dynamic configuration of a slave-RRC provides flexibility to the 5G RAN control plane architecture to adapt to different network deployment scenarios, network conditions, and/or UE conditions. On the other hand, using the slave-RRC to extend independent RRC control may result in benefits such as balancing signalling load, utilizing small cell for both cyclic prefix (CP) and UP transmissions for saving energy and enhancing reliability, and/or optimizing handover (HO) and RI specific RRC configuration, in case of multi-RI multi-connectivity.

Figure 5:
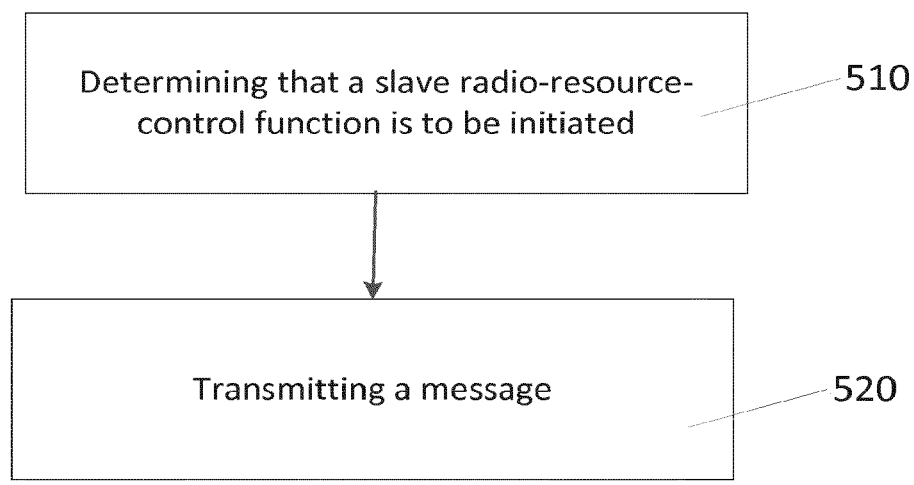
FIG. 5 illustrates a flowchart of a method in accordance with certain embodiments of the present invention.

FIG. 5 illustrates a flowchart of a method in accordance with certain embodiments of the invention. The method illustrated in FIG. 5 includes, at 510, determining, by a network node, that a slave radio-resource-control function is to be initiated. The slave radio-resource-control function is performed by an access point. The method may also include, at 520, transmitting a message to the access point. The message includes at least one of a request to initiate the slave radio-resource-control function and a confirmation that the slave radio-resource-control function can be initiated.

Figure 6:
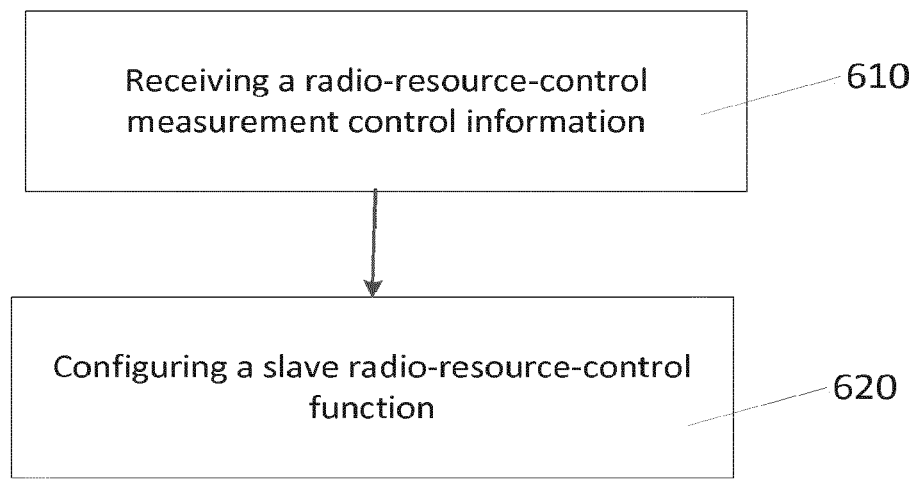
FIG. 6 illustrates a flowchart of a method in accordance with certain embodiments of the invention.

FIG. 6 illustrates a flowchart of a method in accordance with certain embodiments of the invention. The method illustrated in FIG. 6 includes, at 610, receiving, by a user equipment, a radio-resource-control measurement control information. The radio-resource-control measurement control information identifies a list of cells for the user equipment to monitor. The radio-resource-control measurement control information is received from an access point. The method may also include, at 620, configuring a slave radio-resource-control function.

Figure 7:
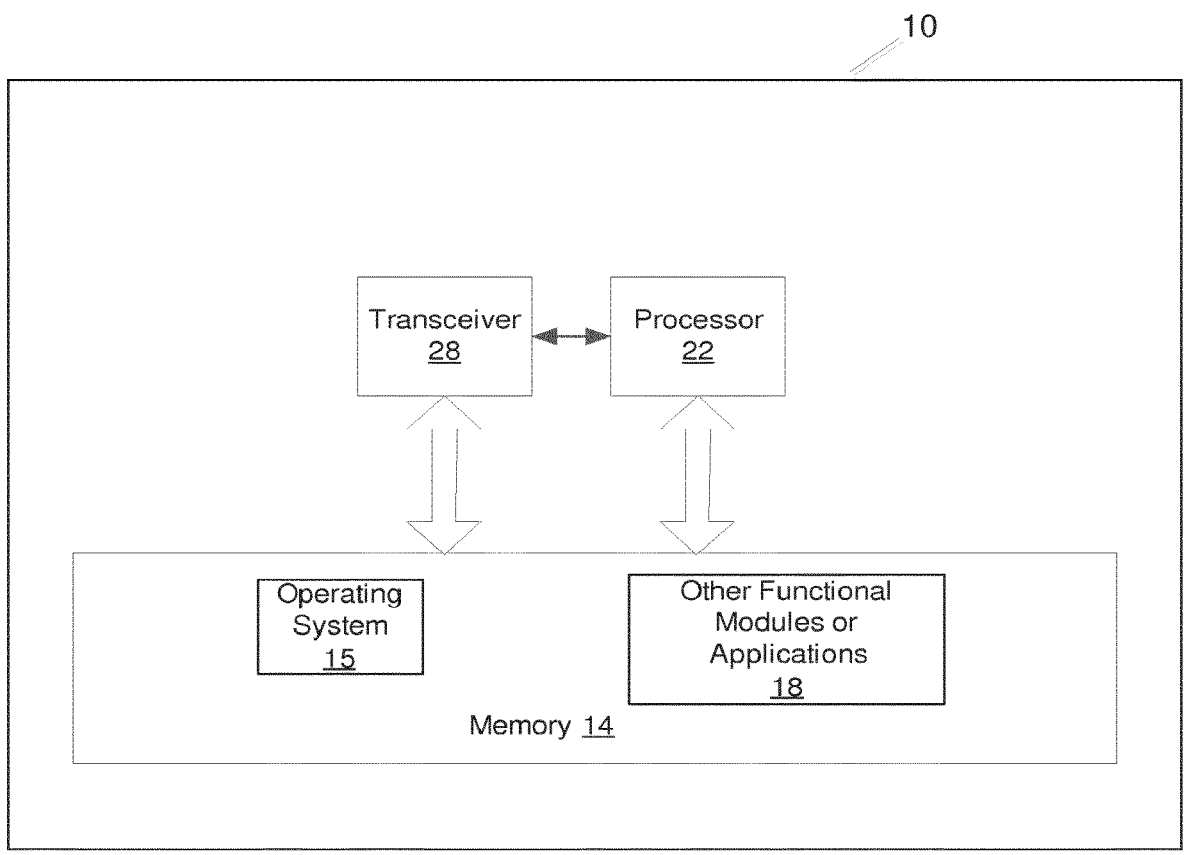
FIG. 7 illustrates an apparatus in accordance with certain embodiments of the invention.

FIG. 7 illustrates an apparatus in accordance with certain embodiments of the invention. In one embodiment, the apparatus can be a network node configured to perform the functions of a master RRC and/or a user equipment, for example. Apparatus 10 can include a processor 22 for processing information and executing instructions or operations. Processor 22 can be any type of general or specific purpose processor. While a single processor 22 is shown in FIG. 7, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 8:
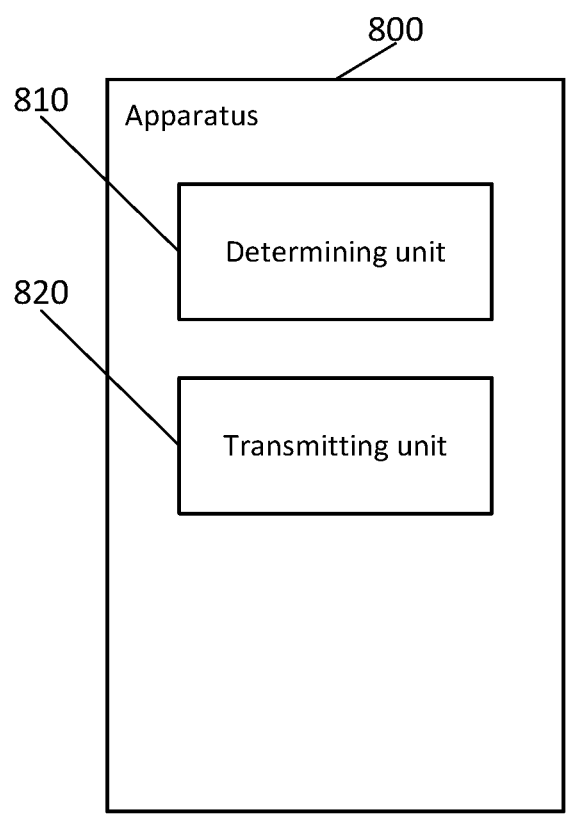
FIG. 8 illustrates an apparatus in accordance with certain embodiments of the invention.

FIG. 8 illustrates an apparatus in accordance with certain embodiments of the invention. Apparatus 800 can be a network element/entity such as a network node that is configured to perform as a master RRC, a slave RRC, and/or a user equipment, for example. Apparatus 800 can include a determining unit 810 that determines that a slave radio-resource-control function is to be initiated. The slave radio-resource-control function is performed by an access point. Apparatus 800 may also include a transmitting unit 820 that transmits a message to the access point. The message includes at least one of a request to initiate the slave radio-resource-control function and a confirmation that the slave radio-resource-control function can be initiated.

Figure 9:
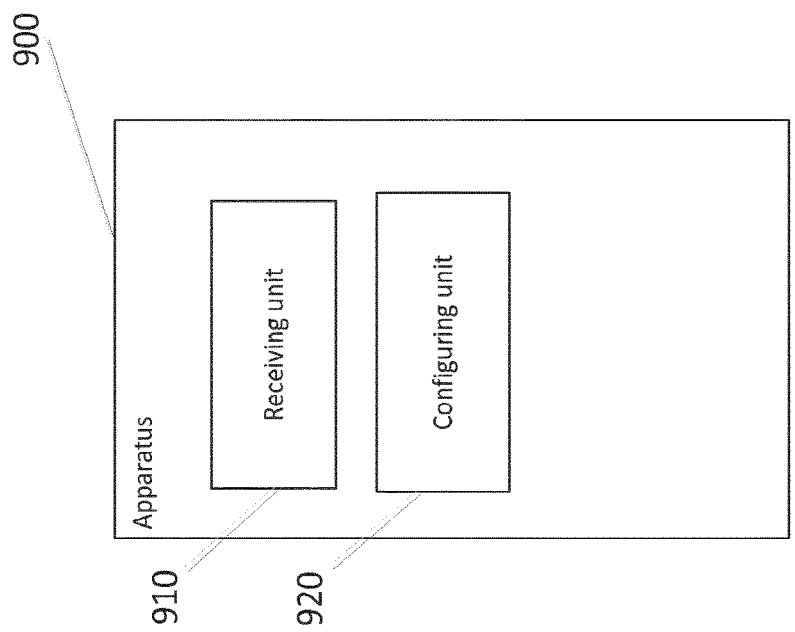
FIG. 9 illustrates an apparatus in accordance with certain embodiments of the invention.

FIG. 9 illustrates an apparatus in accordance with certain embodiments of the invention. Apparatus 900 can be a network element/entity such as a network node that is configured to perform as a master RRC, a slave RRC, and/or a user equipment, for example. Apparatus 900 can include a receiving unit 910 that receives a radio-resource-control measurement control information. The radio-resource-control measurement control information identifies a list of cells for the user equipment to monitor. The radio-resource-control measurement control information is received from an access point. Apparatus 900 may also include a configuring unit 920 that configures a slave radio-resource-control function.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
at least one processor; and
at least one memory including computer program code,
the at least one memory and the computer program code configured, with the at least one processor, to cause the apparatus at least to:
receive, from a first access point which supports a first radio access technology, a radio-resource-control (RRC) reconfiguration message including an RRC configuration information of a second access point, after an initiation of a slave RRC at the second access point has been determined, wherein the second access point supports a second radio access technology; and
perform a random access procedure with the second access point based on the RRC reconfiguration message,
wherein the apparatus is configured to have an RRC connection with the first access point and the first access point is a master node, and
wherein the first radio access technology of the first access point is one of a long-term-evolution (LTE) and a 5G and the second radio access technology is the other of the LTE and the 5G.

2. The apparatus according to claim 1, wherein the at least one memory and the computer program code configured, with the at least one processor, to further cause the apparatus to:
transmit, to the first access point, an RRC reconfiguration complete message indicating the slave RRC function was successfully configured, after the slave RRC function has been successfully completed.

3. The apparatus according to claim 1, wherein the at least one memory and the computer program code configured, with the at least one processor, to further cause the apparatus to:
perform a measurement according to a list of cells provided by the first access point; and
transmit a measurement report based on the measurement to the first access point.

4. The apparatus according to claim 1, wherein the first access node is the master node in a multi-connectivity scenario.

5. A method, comprising:
receiving, by a user equipment from a first access point which supports a first radio access technology, a radio-resource-control (RRC) reconfiguration message including an RRC configuration information of a second access point, after an initiation of a slave RRC at the second access point has been determined, wherein the second access point supports a second radio access technology; and
performing, by the user equipment, a random access procedure with the second access point based on the RRC reconfiguration message,
wherein the user equipment is configured to have an RRC connection with the first access point and the first access point is a master node, and
wherein the first radio access technology of the first access point is one of a long-term-evolution (LTE) and a 5G and the second radio access technology is the other of the LTE and the 5G.

6. The method according to claim 5, further comprising:
transmitting, by the user equipment to the first access point, an RRC reconfiguration complete message indicating the slave RRC function was successfully configured, after the slave RRC function has been successfully completed.

7. The method according to claim 5, further comprising:
performing, by the user equipment, a measurement according to a list of cells provided by the first access point; and
transmitting, by the user equipment, a measurement report based on the measurement to the first access point.

8. The method according to claim 5, wherein the first access node is the master node in a multi-connectivity scenario.

9. An apparatus, comprising:
at least one processor; and
at least one memory including computer program code,
the at least one memory and the computer program code configured, with the at least one processor, to cause the apparatus at least to:
determine, during at least one of a radio leg establishment and a radio leg reconfiguration, that a slave radio-resource-control (RRC) is to be initiated, wherein the slave RRC is performed by a second access point; and
transmit, to the second access point, a request message to initiate the slave RRC at the second access point, the request message including a user equipment capability of a user equipment and a measurement report;
receive, from the second access point, a response message in response to the request message, the response message including a configuration information related with the slave RRC; and
transmit, to the user equipment, an RRC reconfiguration message to cause the UE to perform a random access procedure with the second access point, the RRC reconfiguration message including the configuration information,
wherein the apparatus has an RRC connection with the UE,
wherein the apparatus supports a first radio access technology and the second access point supports a second radio access technology, and
wherein the first radio access technology of the first access point is one of a long-term-evolution (LTE) and a 5G and the second radio access technology is the other of the LTE and the 5G.

10. The apparatus according to claim 9, wherein the at least one memory and the computer program code configured, with the at least one processor, to further cause the apparatus to:
receive, from the user equipment, an RRC reconfiguration complete message indicating the slave RRC function was successfully configured, after the salve RRC function has been successfully completed.

11. The apparatus according to claim 9, wherein the at least one memory and the computer program code configured, with the at least one processor, to further cause the apparatus to:
receive, from the user equipment, a measurement report.

12. The apparatus according to claim 9, wherein the apparatus is a master node in a multi-connectivity scenario.

* * * * *